Jan. 14, 1964  J. E. BARTLETT  3,117,762
VALVE MEMBER ASSEMBLY FOR FAUCETS AND THE LIKE
Filed Nov. 14, 1961

INVENTOR.
Joseph E. Bartlett
BY
Scofield, Kokjer, Scofield & Lowe
ATTORNEYS.

United States Patent Office 3,117,762
Patented Jan. 14, 1964

3,117,762
VALVE MEMBER ASSEMBLY FOR FAUCETS AND THE LIKE
Joseph E. Bartlett, 215 S. Parker Ave., Olathe, Kans.
Filed Nov. 14, 1961, Ser. No. 152,329
1 Claim. (Cl. 251—88)

This invention relates generally to faucets, bibs, flow control valves and the like, and refers more particularly to the construction of valve members for use in such assemblies.

One of the principal objects of the invention is to provide a novel construction for valve members in which the washer retaining member is so connected with the valve stem that the retaining member is free to swivel with respect to the stem as torsional resistance is met during closing and opening of the valve. While swivel type valve members have been developed in the past, the present invention represents a marked improvement thereover, not only from the standpoint of low friction support for the retainer member, but also from the standpoint of cost and ease of assembly.

Another important object of the invention is to provide a swivel type washer mounting for valve stems in which the washer mounting member is normally so restrained against rotation that it will not loosely spin, and in which upon the action of closing pressure, the resistance to rotation decreases.

Still another object of the invention is to provide a swivel type washer and valve stem assembly in which the washer mounting or retaining member can readily be assembled with and disassembled from the stem. This is important to the provision of a unit which can be manufactured at low cost, and also to the provision of a unit in which the washer retaining member can be replaced if damaged by corrosion or otherwise without requiring replacement of the stem also.

A further object of the invention is to provide a valve member construction which makes it possible to incorporate a swivel type washer in extremely short stems without interfering with the normal action of the valve member.

Yet another object of the invention is to provide an improved swivel construction in which the swiveling portion of the unit is effectively protected against wedge locking by accidental displacement of the effective swivel axis.

Other and further objects of the invention, together with the features of novelty appurtenant thereto, will appear in the course of the following description.

In the accompanying drawings which form a part of the specification and are to be read in conjunction therewith, and in which like reference numerals indicate like parts in the various views.

Figure 1:
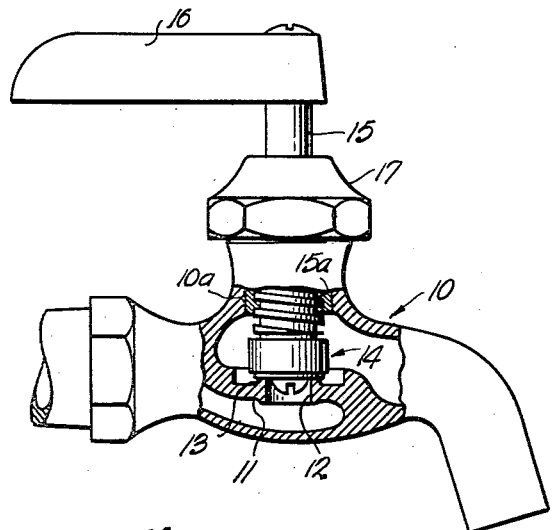
FIG. 1 is a side elevation, with parts broken away, of a typical faucet or bib having a valve member constructed in accordance with the present invention.

Referring to the drawings, in FIG. 1 there is shown a typical faucet 10, having the dividing partition 11 with the passageway 12 terminating in the usual annular valve seat 13. Flow through the faucet is controlled by raising and lowering the valve washer assembly 14 through the medium of the stem 15. The latter terminates in the operating handle 16. The stem 15 is provided with threads 15a which cooperate with similar threads formed in a sleeve 10a in the faucet body 10, as is known. The usual packings (not shown) held in position by the cap nut 17 seal against leakage along the stem.

Figure 2:
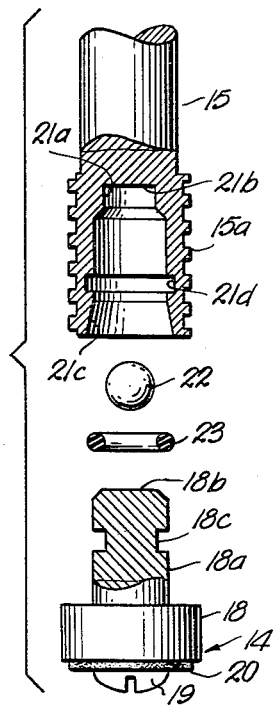
FIG. 2 is an enlarged side elevation of the lower portion of the stem and associated components, the parts being shown in exploded relation and partly in section.
Figure 3:
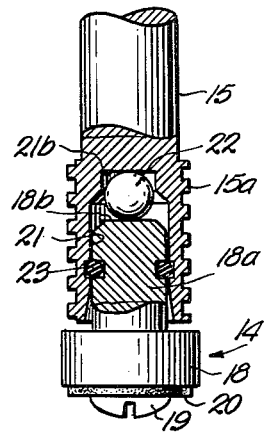
FIG. 3 is an enlarged view similar to FIG. 2, showing the components in assembled relationship.

Turning now to FIGS. 2 and 3, and to a description of the details of the washer assembly 14 and lower end of stem 15, it will be seen that the washer assembly includes the washer mounting or retaining member 18 of generally cylindrical construction. The retaining member is surmounted by a reduced diameter upwardly extending stub portion 18a which is preferably formed integral with the retaining member. The lower face of the retaining member has secured thereto in conventional fashion, as by screw 19, the washer or gasket 20. The screw is received in a suitable tapped aperture (not shown) formed in the member 18, and holds the washer to the retainer.

The stub portion 18a is adapted to fit upwardly into an axial bore 21 formed in the lower end of stem 15. The bore 21 is circular in cross section, as in the stub portion 18a, and the respective diameters are such that the stub portion is closely fitted within, but still freely rotatable in the bore.

As best seen in FIG. 3, the upper or inner end of bore 21 is provided with a reduced diameter portion 21a which joins the upper end wall 21b of the bore. This reduced diameter portion serves to loosely cage a hard ball 22, preferably stainless steel, which is interposed between the upper end surface 18b of the stub portion 18a, and the end surface 21b of the bore 21. Care must be taken to center the ball 22 on the axis of rotation of stub portion 18a within the bore, and to insure that the ball does not bind in the reduced diameter portion 21b of the bore.

The stub portion 18a is retained, under normal conditions of use, against longitudinal displacement from the bore by means of the resiliently deformable O-ring 23 which is of elastomeric composition, for example, neoprene or other rubber-like material. The O-ring is located partly in a first annular groove 18c formed in the stub portion 18a, and partly in an opposed groove 21d formed in the inner wall of the bore 21.

In the preferred construction of the invention, the distance between the plane of the upper edge of groove 18c and the plane of end surface 18b, measured along the axis of the bore, is slightly greater than the distance between the plane of the upper edge of groove 21d and the plane of surface 18b. In other words, the grooves 18c and 21d are slightly offset with respect to one another in the axial direction, with the groove 18c slightly lower than the groove 21d. The grooves are given a width (in the vertical direction) such that the ring 23 is under a slight shear stress when the parts are assembled as in FIG. 3. Because of the resilient nature of the O-ring material, the effect is that the ring serves to maintain the ball 22 under slight pressure at all times, and at the same time sets up a minimal resistance to turning of the stub portion in the bore. This is desirable from the standpoint of preventing rattles and excessively loose swiveling of the washer member in the faucet.

It will be observed that the bore 21 is also preferably provided with a tapered or flared entrance throat 21c. The degree of taper has been somewhat exaggerated in the drawings for the purposes of illustration; preferably it should be such as to permit relatively easy insertion of the stub portion 18a, with the O-ring thereon, during assembly of the valve, as will later be described. In the assembly of the retaining member 18 with the stem, the initial step is to expand the O-ring 23 sufficiently to slip it over the upper end of the stub portion 18a and downwardly therealong until it snaps into the groove 18c. The stem 15 is up-ended so that the bore opens upwardly and the ball 22 is deposited therein. Thereupon the stub portion 18a is forced into the bore in an axial direction until the O-ring 23 snaps into the groove 21d. The groove 18c should be of such depth and width that it will accommodate the necessary deformation of O-ring 23 to permit the O-ring to advance sufficiently in the bore to snap back out into groove 21d. The stem is now ready for assembly with the faucet in the manner shown in FIG. 1.

Due to the provision of a single ball as the swivel support, I have found that there is much greater freedom of the washer assembly 14 to swivel relative to the stem during the time that the washer is in contact with the valve seat. Aside from the minimal resistance to twisting offered by the O-ring 23, there are only two points of contact between the washer assembly and stem, and these are at the diametrically opposed points on the ball in contact with the end surfaces 18b and 21b. The reduced diameter portion 21a has the effect of caging the ball sufficiently that the pivot axis will remain aligned substantially with the axis of rotation of the stub portion 18b. Accordingly, there is no possibility for the ball to work outwardly from this axis of rotation, thus setting up a wedging effect which might otherwise prevent the free swivel action necessary to successful operation.

It will be evident that as the axial pressure on the washer assembly 14 is increased during closing of the valve, the ease of swiveling is increased. This is because of the previously described slight offset between the grooves 18c and 21d. The slightest upward displacement of the stub portion 18a in the bore relieves the shearing stress in the O-ring, and thus permits freer turning of the washer assembly at the times when it is most necessary to protect the washer.

Figure 4:
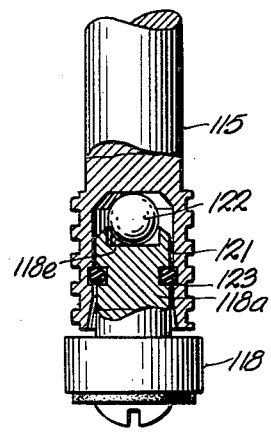
FIG. 4 is a view like FIG. 3, but of a modified form of the invention.

It will also be apparent that the washer assembly 14 can easily be removed from its coupling with the stem and replaced by a new one. By exerting sufficient longitudinal thrust on the washer assembly, the O-ring can be snapped back out of the bore groove 21d and the tub portion 18 withdrawn. Replacement is accomplished in the same manner as initial assembly of the components. In FIG. 4, I have shown a modified form of the invention wherein the caging of the ball is accomplished through the provision of a recess 118e formed in the upper end of the stub portion 118. As in the preceding embodiment, the stem 115 is provided with a bore 121. However, the bore of the embodiment of FIG. 4 does not include as a necessary part thereof the reduced diameter portion of the preceding embodiment, since the caging of the ball is effectively done by the recess 118e.

The embodiment of FIG. 4 is particularly useful in the construction of valve assemblies where it is undesirable to penetrate too deeply into the lower end of the stem. In all other respects the embodiment of FIG. 4 is like that previously described, including the O-ring 123 which serves to resiliently and yieldably retain the washer assembly coupled with the stem.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

In a faucet valve member, the combination of a stem provided at one end with a bore extending axially into said stem, said bore closed at its inner end, a ball member centered in said bore and contacting the inner end thereof, a washer retaining member having a stub portion extending rotatably into said bore and having an inner end portion contacting the ball member, said stub portion and bore provided respectively with confronting annular grooves, said grooves being slightly offset with respect to one another in the axial direction with the groove in the bore closer to the inner end of said bore than the groove in the stub, an endless ring member of resiliently deformable material circumscribing said stub portion with opposite portions of said ring engaged in said grooves, said grooves having widths respectively in the axial direction such that said ring member is resiliently deformed to set up an axial shear stress in said ring member operating to bias said stub against said ball and at the same time impose frictional resistance to rotation of said stub in said bore.

References Cited in the file of this patent

UNITED STATES PATENTS

| 2,352,249 | Briggs | June 27, 1944 |

FOREIGN PATENTS

| 705,815 | Great Britain | Mar. 11, 1954 |